INVENTOR
Milton Kessler

United States Patent Office 3,487,244
Patented Dec. 30, 1969

3,487,244
AIR-DRIVEN MOTOR VIBRATOR ASSEMBLY
Milton Kessler, 6690 Harrington,
Youngstown, Ohio 44512
Filed Feb. 19, 1968, Ser. No. 707,391
Int. Cl. H02k 7/06, 7/10
U.S. Cl. 310—81                    5 Claims

ABSTRACT OF THE DISCLOSURE

A motor-driven vibrator assembly having a motor-driven fan rotating in a fixed housing, on the interior of which lies a raceway containing a single ballbearing free to roll within the raceway under the influence of air driven circularly by the fan to thus provide, in effect, an eccentric weight causing the entire assembly, and anything fixed to it, to vibrate.

This invention relates to vibrators, and particularly to vibrators of the type intended to provide a vibrating or shaking motion to industrial shaker devices such as are used for causing small particles to move down an inclined plane at a relatively low rate so that they may be conveyed during assembly, sorted, inspected, and so forth, Present devices of this type usually employ an eccentric weight fixed to a motor shaft so that energization of the motor imparts a vibratory action to the entire assembly of which the motor is a part. In practice, such devices tend to impart severe strains to both the motor assembly of which they are a part, and to the devices to which they are attached. The present invention provides, in effect, a fluid drive connection between the eccentric element and the motor drive, whereby the vibratory action is much smoother than before, and this result is accomplished by exceedingly simple and inexpensive means, which nevertheless provides a rugged and dependable construction.

The specific nature of the invention as well as other objects and advantages thereof will clearly appear from a description of a preferred embodiment as shown in the accompanying drawing, in which.

Figure 1:
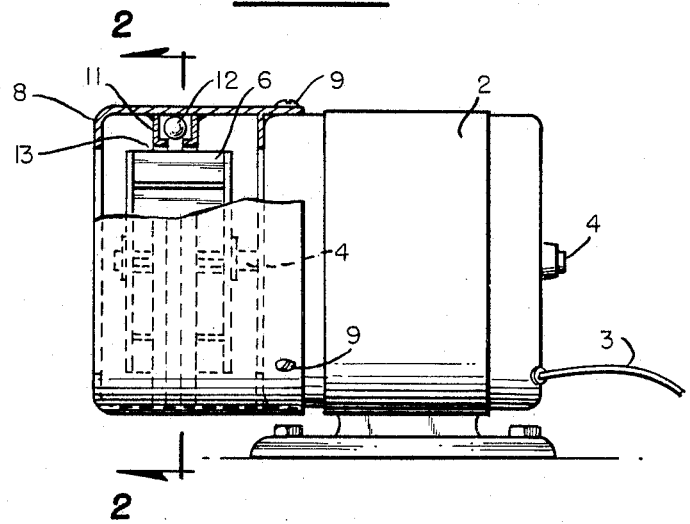
FIG. 1 is a side elevation, partly in section, of an assembly in accordance with the invention.
Figure 2:
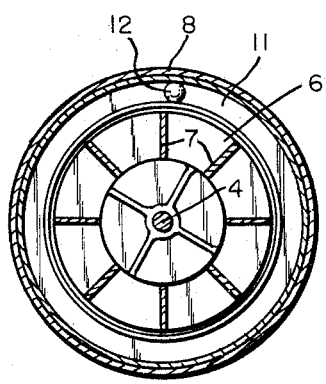
FIG. 2 is a view taken on line 2—2 of FIG. 1.

A vibrator assembly comprises an electric motor 2 having the usual electric cord 3 for supplying power thereto, thus causing rotation of the motor shaft 4, to which is fixed a fan 6 exemplified as an ordinary centrifugal fan device having a number of radially arranged blades 7, which tend to throw air outwardly when the fan blades are rapidly rotated by the motor shaft. A fan housing 8 is secured to the motor 2 in any manner, as by screws, 9 the fan 6 and housing 8 being centrically arranged, unlike the usual practice in the case of a centrifugal motor wherein the air chamber is eccentric with respect to the fan blades, since in this case it is not desired to throw a stream of air tangential to the fan blades, but instead to provide a circularly rotating air volume within the fan housing when the fan is rotated.

Fixed to the interior of fan housing 8 is a raceway 11 containing a ballbearing 12 which is freely movable within the raceway, but is retained therein in any suitable manner, as for example, by inturned ends 13. It will be noticed that the raceway is open toward the fan blades, and in general it is preferred that the raceway construction be as light and open as possible, so as to be influenced as much as possible by the movement of air within the fan housing, as wil be explained below.

In operation, when the fan blades are rotated, a very powerful circulation of air is set up within the fan housing, and the ball 12, which may be of lightweight construction, such as aluminum or even a plastic ball, if desired, is carried along in the strong circular air current produced, to the point where it rotates rapidly and circularly within its raceway. The ball 21 thus acts as an eccentric weight, and causes the entire assembly, together with any device to which it is fastened, to vibrate rapidly. Due to the fact that there is, in effect, a fluid coupling between the fan blades and the eccentric weight 12 thus provided, the vibratory motion is comparatively gentle, and in particular does not oppose the severe strains on the above-described assembly which tends to occur in the case of fixed-eccentric devices, resulting in lengthened life of the equipment, as well as more satisfactory operation.

Figure 3:
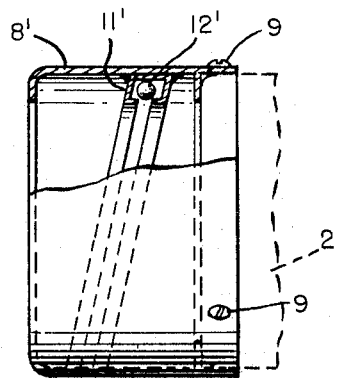
FIG. 3 is a view similar to FIG. 1 of the fan housing, showing a modified type of raceway.

FIG. 3 shows a modified form of the device in which the raceway 11' is not in a plane orthogonal to the shaft axis as in FIG. 1, but in a plane set at a slight angle to the shaft. This causes a small longitudinal component of force to be provided as the ball rotates in the raceway, and has the advantage of ensuring that there will be a component of vibratory motion in substantially every direction, thus making it unnecessary to mount the assembly in a particular orientation with respect to the device which is being shaken. The fan and housing can also be made of a suitable plastic material, such as nylon, which has, among other features, the advantage of being relatively quiet in operation.

It will be apparent that the embodiments shown are only exemplary and that various modifications can be made in construction and arrangement within the scope of the invention as defined in the appended claims.

I claim:
1. A motor-driven vibrator device comprising
   (a) an electric motor having a motor housing and a central shaft protruding at one end beyond the housing,
   (b) a fan device mounted on said protruding motor shaft, said fan having blades fixed with respect to such shaft for rotation therewith,
   (c) a fan housing fixed with respect to the motor housing and surrounding said fan,
   (d) a continuous raceway fixed to the interior of said fan housing,
   (e) a ball in said raceway free to roll therein under the influence of air moved by rotation of said fan blades.
2. The invention according to claim 1, said fan blades being arranged to provide a substantial circular component of motion to air within said housing when the shaft is rotated.
3. The invention according to claim 2, said raceway being open to air driven circularly by said fan.
4. The invention according to claim 1, said raceway lying in a plane orthogonal to said shaft and providing a closed circular path for said ball.
5. The invention according to claim 1, said raceway lying in a plane which is non-orthogonal to the axis of said shaft to thus provide an oval path for said ball, in which the ball has a component of motion parallel to the shaft axis during a full cycle of travel in said raceway.

References Cited

UNITED STATES PATENTS

| | | | |
|---|---|---|---|
| 1,459,847 | 6/1923 | Mitchell | 74—87 |
| 2,829,527 | 4/1958 | Fleming | 74—87 X |
| 2,829,529 | 4/1958 | Fleming | 74—87 |
| 2,945,386 | 7/1960 | Peterson | 310—81 X |
| 3,036,471 | 5/1962 | Peterson | 74—87 |
| 3,400,913 | 9/1968 | Matson | 74—87 X |

MILTON O. HIRSHFIELD, Primary Examiner

M. O. BUDD, Assistant Examiner

U.S. Cl. X.R.

74—87